US 6,733,139 B2

(12) United States Patent
Childers et al.

(10) Patent No.: US 6,733,139 B2
(45) Date of Patent: May 11, 2004

(54) PROJECTOR WITH NARROW-SPECTRUM LIGHT SOURCE TO COMPLEMENT BROAD-SPECTRUM LIGHT SOURCE

(75) Inventors: Winthrop D. Childers, San Diego, CA (US); Mark A. Van Veen, Cardiff by the Sea, CA (US); Mohammad M. Samii, La Jolla, CA (US); William J. Allen, Corvallis, OR (US); Jack H. Schmidt, Carlsbad, CA (US); Steven W. Steinfield, San Diego, CA (US); Wayne M. Richard, San Diego, CA (US); James R. Cole, Albany, OR (US); James P. Dickie, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 96 days.

(21) Appl. No.: 10/138,590

(22) Filed: May 3, 2002

(65) Prior Publication Data
US 2002/0145708 A1 Oct. 10, 2002

Related U.S. Application Data

(63) Continuation-in-part of application No. 09/587,446, filed on Jun. 5, 2000, now abandoned.

(51) Int. Cl.[7] .............................................. G03B 21/14
(52) U.S. Cl. ................. 353/94; 353/31; 353/84
(58) Field of Search ......................... 353/31, 94, 84, 353/38, 33, 34, 37; 362/231, 230, 293; 349/5, 7, 8, 9

(56) References Cited

U.S. PATENT DOCUMENTS

| 5,428,408 | A | | 6/1995 | Stanton ..................... 348/742 |
| 5,580,142 | A | * | 12/1996 | Kurematsu et al. ........... 353/31 |
| 5,612,753 | A | | 3/1997 | Poradish et al. ............ 348/743 |
| 5,654,775 | A | | 8/1997 | Brennesholtz ............. 348/742 |
| 6,147,720 | A | | 11/2000 | Guerinot et al. ........... 348/744 |
| 6,252,636 | B1 | | 6/2001 | Bartlett ....................... 348/743 |
| 6,371,617 | B1 | * | 4/2002 | Nishida et al. ............. 353/122 |
| 6,398,389 | B1 | | 6/2002 | Bohler et al. |
| 6,409,349 | B1 | * | 6/2002 | O'Connor .................... 353/31 |
| 6,505,939 | B1 | * | 1/2003 | Bierhuizen et al. ........... 353/94 |
| 6,561,654 | B2 | * | 5/2003 | Mukawa et al. ............. 353/31 |
| 2002/0186349 | A1 | * | 12/2002 | Wichner et al. ............. 353/29 |

FOREIGN PATENT DOCUMENTS

| GB | 2 312 121 | 10/1997 |
| JP | 9050082 | 2/1997 |

* cited by examiner

Primary Examiner—William C. Dowling

(57) ABSTRACT

A projector that has a narrow-spectrum light source to complement a broad-spectrum light source is disclosed. The broad-spectrum light source has a broad spectrum. The narrow-spectrum light source has a narrow spectrum complementing the broad spectrum of the broad-spectrum light source.

17 Claims, 9 Drawing Sheets

PROJECTOR WITH NARROW-SPECTRUM LIGHT SOURCE TO COMPLEMENT BROAD-SPECTRUM LIGHT SOURCE

RELATED APPLICATIONS

The present patent application is a continuation-in-part of the previously filed and copending patent application entitled "Multi-Source LCD Backlight for White Balance Adjustment" [attorney docket no. 10003006-1], filed on Jun. 5, 2000, now abandoned and assigned Ser. No. 09/587,446.

BACKGROUND OF THE INVENTION

Projectors are generally devices that integrate light sources, optics systems, electronics, and displays for projecting images from computers or video devices onto walls or screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications. Some industry pundits predict that digital projectors will also become the standard projection technology used in movie theaters.

The light sources utilized in projectors are an integral factor in the resulting quality of the projected image. A light source is desirably small in size, long lasting, and uniform in the light that it produces. Until recently, most projectors relied on metal halide lamps that employ a spark across a gas-filled gap to create light. However, metal halide lamps tended to have color and luminance stability problems, and tended to deposit materials on their sidewalls during operation, resulting in reduced brightness. More recently, some projectors have been using ultra high pressure (UHP) arc lamps. These lamps use an arc in a pure mercury vapor under high pressure. The arc gap is much smaller than the gas-filled gap of a metal halide lamp, resulting in greater lighting efficiency. Small amounts of oxygen and halogen are usually mixed with the mercury vapor, helping to remove material deposits from a lamp's sidewalls, which maintains the lamp's brightness substantially throughout its lifetime.

However, UHP mercury-vapor arc lamps, as well as other types of lamps used in projectors, still suffer from some drawbacks. Arc lamps, for instance, usually output less light at red wavelengths than they do at other wavelengths. This means that parts of the images being projected that rely on red wavelengths of light for rendering may not appear as bright, or may appear inaccurate as compared to how they should appear. Arc lamps may also have uneven color intensities. For instance, the light output at blue wavelengths, or at green wavelengths, may only be able to be produced at deep or dull tones. This means that parts of the images being projected that rely on these wavelengths of light for rendering may appear dull, or may also appear inaccurate as compared to how they should appear.

For these and other reasons, therefore, there is a need for the present invention.

SUMMARY OF THE INVENTION

The invention relates to a projector that has a narrow-spectrum light source to complement a broad-spectrum light source. The broad-spectrum light source has a broad spectrum. The narrow-spectrum light source has a narrow spectrum complementing the broad spectrum of the broad-spectrum light source.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
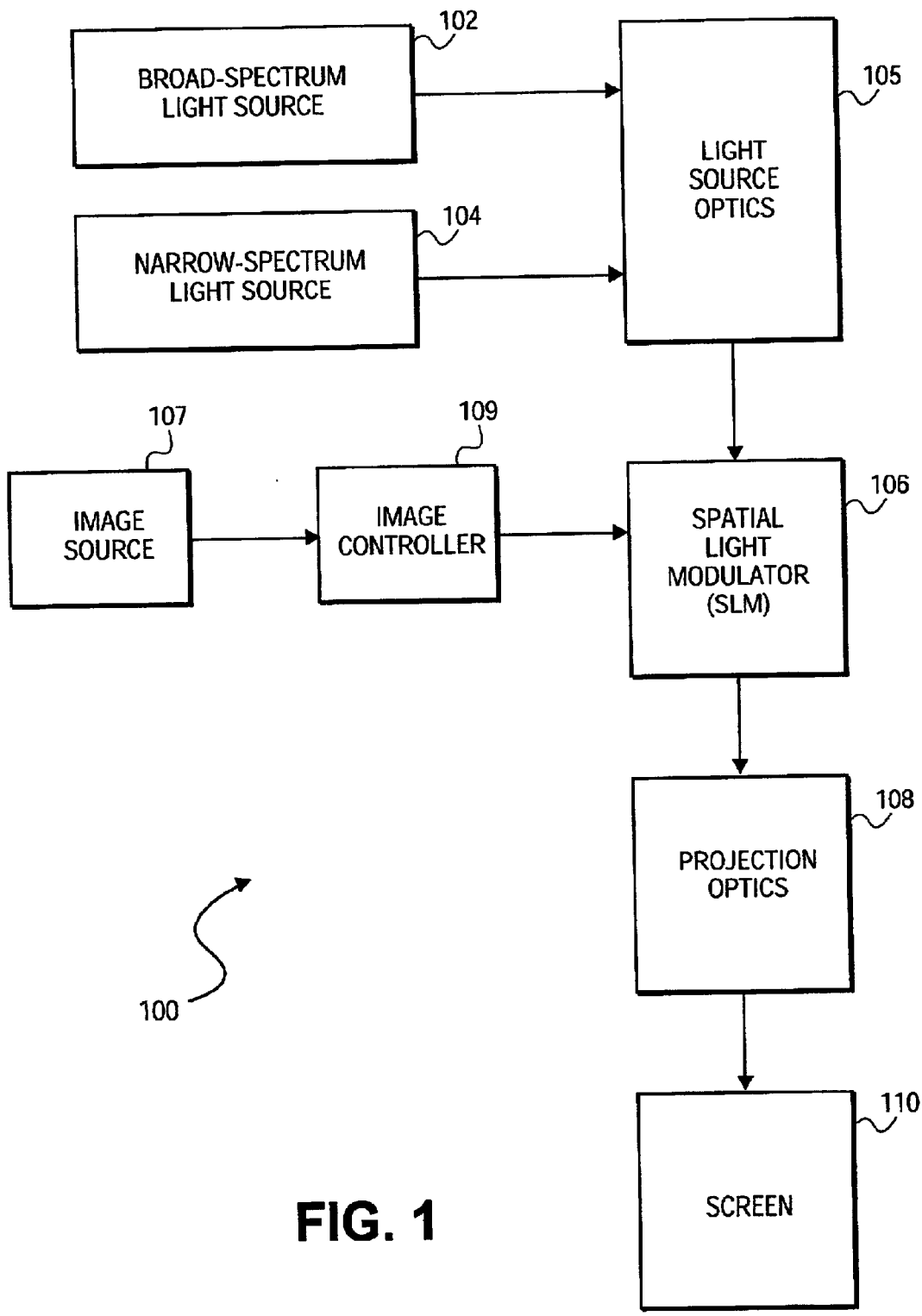
FIG. 1 is a block diagram of a general projection system according to an embodiment of the invention that includes a broad-spectrum light source and a narrow-spectrum light source.

FIG. 1 shows a block diagram of a projection system 100 according to an embodiment of the invention. The system 100 may be implemented as a projector. The projection system 100 includes a broad-spectrum light source 102, a narrow-spectrum light source 104, a spatial light modulator (SLM) 106, projection optics 108, and a screen 110. The system 100 also includes light source optics 105, an image source 107, and an image controller 109. The broad-spectrum light source 102 outputs light at a broad spectrum, and can be considered a means for emitting such light. It may be an ultra high pressure (UHP) mercury vapor arc lamp, or another type of broad-spectrum light source. By comparison, the narrow-spectrum light source 104 outputs light within a narrow spectrum, and can be considered a means for emitting such light. It may be one or more light-emitting diodes (LED's), or another type of narrow-spectrum light source. A narrow spectrum is generally defined as only a portion of the visible light spectrum. By comparison, a broad spectrum is substantially, but not necessarily completely, the visible light spectrum.

The light source optics 105 process the light output by the light sources 102 and 104 for output to the SLM 106. The image controller 109 prepares an image signal received from the image source 107 for output to the SLM 106. The image source 107 may be a computer, a video device, and so on. The image may be a still image or a moving image. The SLM 106 in turn modulates the light output by both the broad-spectrum light source 102 and the narrow-spectrum light source 104, as received through the light source optics 105, in accordance with the desired image, as received through the image controller 109. The SLM may be a liquid-crystal display (LCD) SLM, a digital light processing (DLP) SLM, or another type of SLM. In the case of a DLP SLM, the SLM may more specifically be a digital micromirror display (DMD).

The broad-spectrum light source 102 outputs broad-spectrum light that likely suffers from a partial (i.e., narrow) spectral power deficiency. Broad-spectrum light is generally and non-restrictively defined as light that has wavelengths substantially across the entire visible light spectrum. Thus, the broad-spectrum light source 102 is a light source that can generate light having wavelengths substantially across the entire visible light spectrum. A partial spectral power deficiency is where the light has a power deficiency in at least a part of the spectrum of light output. The partial spectral power deficiency may more specifically be one of at least two different defects, among others. First, the light output may not be as bright in one part of the spectrum as compared to the other spectral parts. Second, the light output may not have as high a color intensity in one spectral part as compared to the other parts.

Figure 2A:
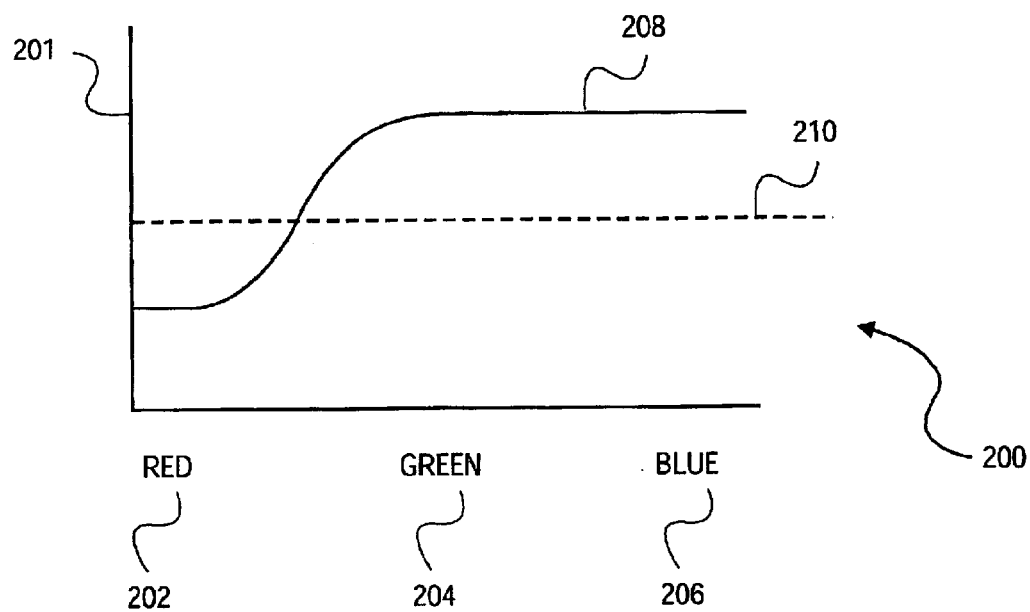
FIGS. 2A and 2B are diagrams illustrating two different types of partial spectral deficiencies of a broad-spectrum light source, according to varying embodiments of the invention.

FIG. 2A shows a graph 200 illustrating a partial spectral deficiency in which the light output is not as bright in one spectral part as compared to other spectral parts. The graph 200 of FIG. 2A, like all other graphs of this patent application, is an idealized representation, and is not meant as an actual representation. That is, the graphs of this patent application are for illustrative purposes only. The axis 201 measures brightness. The spectrum has three chief parts, a red part 202, a green part 204, and a blue part 206. The line 208 indicates the brightness of the light output across these spectral parts. The dotted line 210 indicates a threshold brightness level that is desired across the entire spectrum. As shown in FIG. 2A, the light output falls below the threshold brightness level at the red wavelengths within the red spectral part 202. That is, there is a partial spectral deficiency at red wavelengths of light.

Figure 2B:
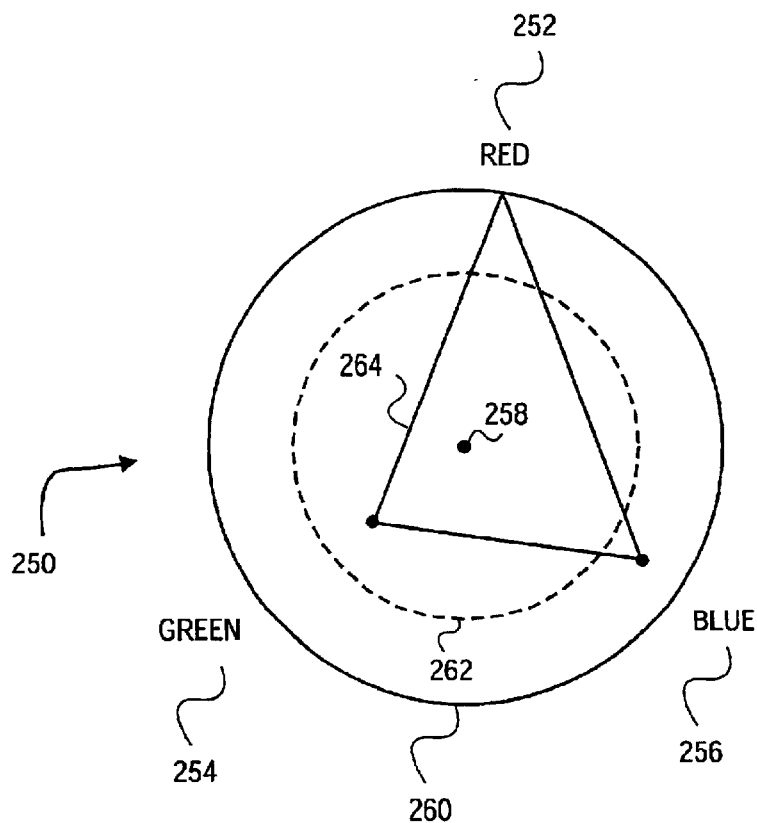

FIG. 2B shows a color intensity chart 250 illustrating a partial spectral deficiency in which the light output has a color intensity that is not as high in one spectral part as compared to other spectral parts. The chart 250 has a center 258 corresponding to a low color intensity that increases radially therefrom to a high color intensity indicated by the outside circle 260. The spectrum has three chief parts, a red part 252, a green part 254, and a blue part 256. The triangle 264 represents the color intensity of the light output across these spectral parts. The dotted circle 262 indicates a threshold color intensity level that is desired across the entire spectrum. As shown in FIG. 2B, the light output falls below the threshold color intensity level at the green wavelengths within the green spectral part 254. That is, there is a partial spectral deficiency at green wavelengths of light. There may also be a partial spectral deficiency at other wavelengths of light, such as at blue wavelengths of light, and so on.

The narrow-spectrum light source 104 of FIG. 1 outputs narrow-spectrum light that has a narrow spectrum complementing the broad spectrum of the broad-spectrum light source 102 of FIG. 1. Narrow-spectrum light is generally and non-restrictively defined as light that has wavelengths in only a part of the visible spectrum. For instance, the narrow-spectrum light may have only the red wavelengths of the visible spectrum, the green wavelengths of the visible spectrum, or the blue wavelengths of the visible spectrum, and so on. Thus, the narrow-spectrum light source 104 is a light source that can generate light having wavelengths only in a part of the visible light spectrum. This narrow spectrum preferably corresponds to the partial spectral deficiency of the broad spectrum of the broad-spectrum light source 102. That is, the light output by the narrow-spectrum light source 104 may have a brightness at a narrow spectrum compensating for lower brightness at a part of this broad spectrum, or a high color intensity at a narrow spectrum compensating for a lower color intensity at a part of this broad spectrum, and so on.

Figure 3A:
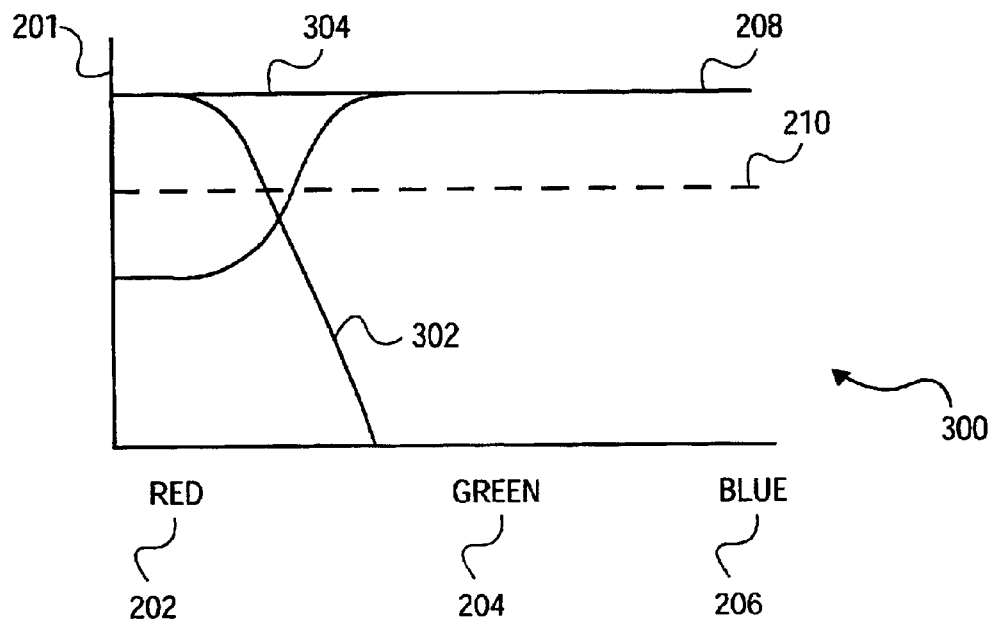
FIGS. 3A and 3B are diagrams illustrating how use of a narrow-spectrum light source can compensate for and substantially correct the partial spectral deficiencies of FIGS. 2A and 2B, respectively, according to varying embodiments of the invention.

FIG. 3A shows a graph 300 illustrating how the narrow spectrum of light compensates for and corresponds to the partial spectral deficiency of the broad spectrum of light in terms of brightness, according to an embodiment of the invention. As before, the axis 201 measures brightness, and there are three primary spectral parts, a red part 202, a green part 204, and a blue part 206. The line 208 indicates the brightness of the broad-spectrum light across these spectral parts. The dotted line 210 indicates a threshold brightness level that is desired across the entire spectrum. The line 208 falls below the dotted line 210 primarily at the red spectral part 202.

The line 302 of FIG. 3A indicates the brightness of the narrow-spectrum light across the spectral parts 202, 204, and 206. As a result of its narrow spectrum, the light only is output at one spectral part, the red spectral part 202, and not at the green part 204 or at the blue part 206. The brightness of the narrow-spectrum light at the red spectral part 202, however, is greater than the threshold level indicated by the dotted line 210. Thus, combining the narrow-spectrum light indicated by the line 302 with the broad-spectrum light indicated by the line 208 yields the horizontal line 304, which represents light having a brightness level greater than the threshold level across the entire spectrum. In this way, the narrow spectrum of light compensates for and corresponds to the partial spectral deficiency of the broad spectrum of light in one embodiment of the invention.

Figure 3B:
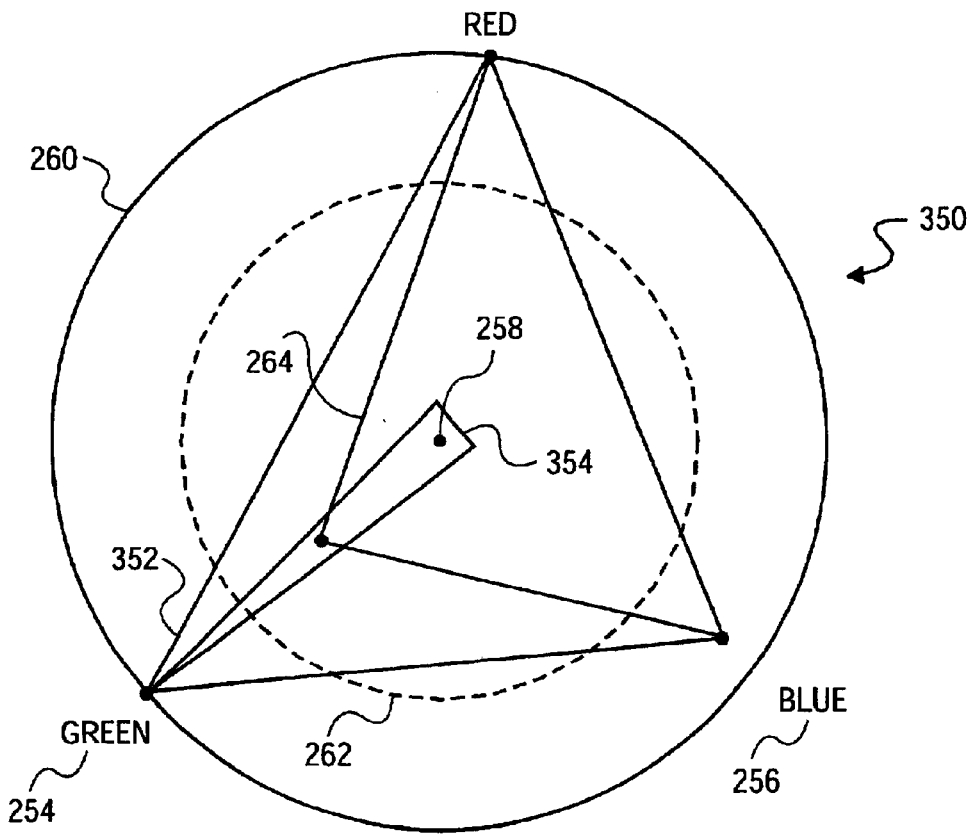

FIG. 3B shows a color intensity chart 350 illustrating how the narrow spectrum of light compensates for and corresponds to the partial spectral deficiency of the broad spectrum of light in terms of color intensity, according to another embodiment of the invention. As before, there is a chart center 258 correlating with a low color intensity that increase radially therefrom to a high color intensity indicated by the outside circle 260. The spectrum has three primary parts, a red part 252, a green part 254, and a blue part 256. The dotted circle 262 indicates a threshold color intensity level that is desired across the entire spectrum. The triangle 264 represents the color intensity of the broad-spectrum light output across the spectrum, where there is a partial spectral deficiency at the green spectral part 254, at which the color intensity is undesirably low.

The triangle 354 of FIG. 3B indicates the color intensity of the narrow-spectrum light across the spectral parts 252, 254, and 256. As a result of its narrow spectrum, the light is substantially output only at one spectral part, the green spectral part 254, and not at the red spectral part 252 or at the blue spectral part 256. The color intensity of the narrow-spectrum light at the green spectral part 254, however, is higher than the threshold level indicated by the dotted circle 262. Thus, combining the narrow-spectrum light indicated by the triangle 354 with the broad-spectrum light indicated by the triangle 264 yields the triangle 352, which represents light having a color intensity higher than the threshold level across the entire spectrum. In this way, the narrow spectrum of light compensates for and corresponds to the partial spectral deficiency of the broad spectrum of light in one embodiment of the invention.

The broad-spectrum light source 102 of FIG. 1 can be considered a primary light means, whereas the narrow-spectrum light source 104 can be considered a compensatory light means. The primary light means is for providing light that has a broad spectrum, but that which is weak at a portion, such as a narrow portion, of the broad spectrum. The compensatory light means is for compensating for the narrow portion of the broad spectrum at which the light is weak. The part of the broad spectrum at which the light is weak may be, for example, the red spectral part, the green spectral part, or the blue spectral part, among other parts of the spectrum. It may be weak in terms of light brightness, color intensity, and so on.

First Specific Embodiment of Projection System

Figure 4:
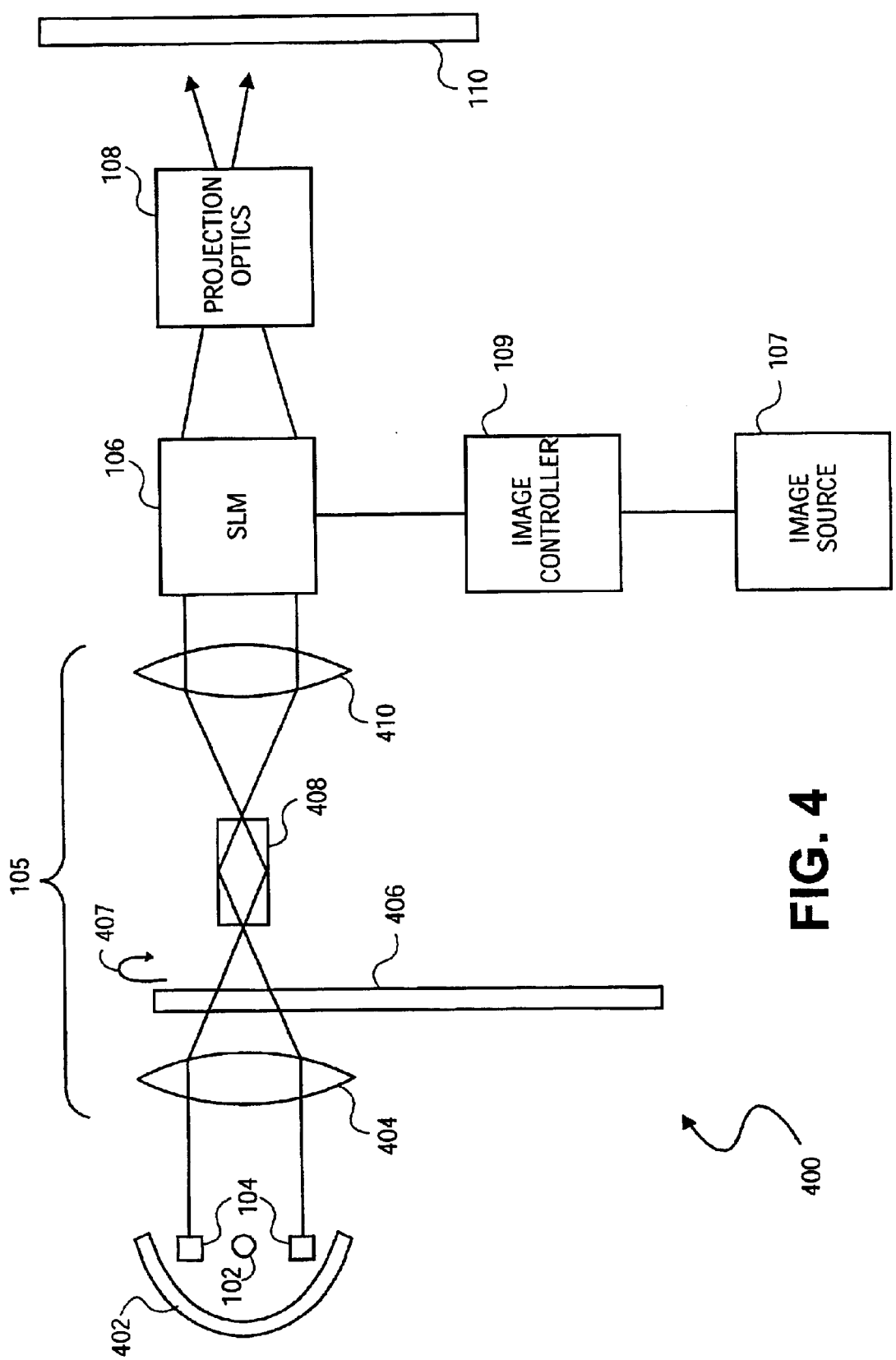
FIG. 4 is a cross-sectional side-view diagram of a projection system according to a specific embodiment of the invention in which narrow-spectrum light is combined with broad-spectrum light before passing through a rotatable color wheel.
Figure 5:
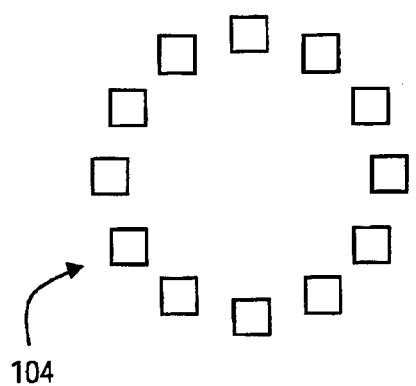
FIG. 5 is a front-view diagram of the narrow-spectrum light source of FIG. 4, according to an embodiment of the invention.

FIG. 4 shows a cross-sectional side profile of a system 400 according to an embodiment of the invention. The system 400 is consistent with the system 100, and shows the system 100 in more detail in accordance with a specific embodiment of the invention. The broad-spectrum light source 102 is preferably optically centered within the reflector 402, which is at least substantially elliptical in shape. The reflector 402, and other reflectors of the invention, may have other shapes as well. The broad-spectrum light source 102 may also be considered the primary light source. The narrow-spectrum light source 104 preferably includes a ring of LED's centered around the broad-spectrum light source 102. FIG. 5 shows a front view of the narrow-spectrum light source 104 in such an instance. The narrow-spectrum light source 104 may also be considered the secondary light source. The narrow-spectrum light source 104 may be said to be adjacent to the broad-spectrum light source 102, although the positioning of the former to the latter as shown in FIG. 4 is one example of such adjacency.

Referring back to FIG. 4, the light from the narrow-spectrum light source 104 is combined with the light from the broad-spectrum light source 102 before proceeding through the light source optics 105. As has been described, the broad-spectrum light source 102 has a partial spectral deficiency that is compensated for by the narrow-spectrum light source 104. Thus, this compensation or correction takes place prior to any light from the narrow-spectrum light source 104 or from the broad-spectrum light source 102 reaching the light source optics 105. The light source optics 105 in the system 400 includes a condenser lens 404, a rotatable color wheel 406, an integration rod 408, and a collimating lens 410. The condenser lens 104 and/or the collimating lens 410 can be comprised of single or multiple glass elements.

The condenser lens 404 focuses the combined light from the broad-spectrum light source 102 and the narrow-spectrum light source 104, as reflected by the elliptical reflector 402. The condenser lens 404 specifically focuses this light through the rotatable color wheel 406, which rotates into and perpendicular to the plane of FIG. 4, as indicated by the arrow 407. The color wheel 406 is used to pass through light of a particular color at a given time, such that at that time only the parts of the image to be projected having that color are displayed. That is, the system 400, instead of creating red, green, and blue images at the same time and combining them optically, creates the red, green, and blue images at different times, relying on the viewer's visual system to recombine them.

Figure 6A:
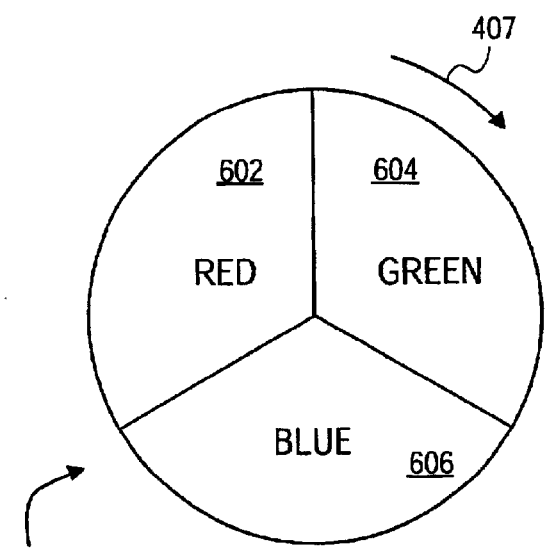
FIGS. 6A and 6B are front-view diagrams of different types of rotatable color wheels that can be used as the rotatable color wheel of FIG. 4, according to varying embodiments of the invention.
Figure 6B:
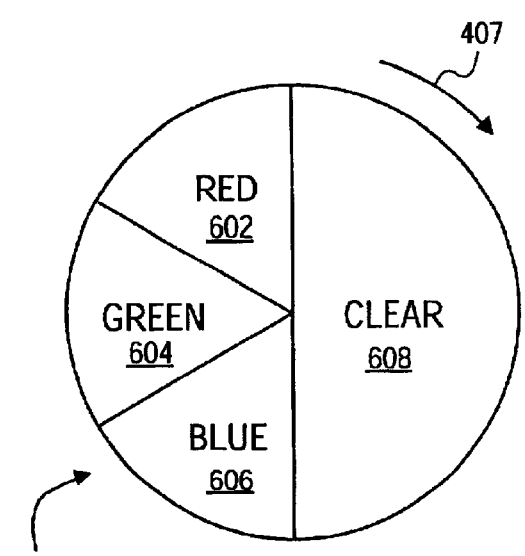

FIGS. 6A and 6B show front views of different color wheels 406. The color wheel 406 of FIG. 6A is divided into three equal portions, a red portion 602, a green portion 604, and a blue portion 606. When the red portion 602 is incident to the combined light from the broad-spectrum light source 102 and the narrow-spectrum light source 104, then only the red wavelengths are passed. Similarly, when the green portion 604 or the blue portion 606 is incident to the combined light from the light sources 102 and 104, only the green or blue wavelengths, respectively, are passed. The color wheel 406 of FIG. 6B is similar to that of FIG. 6A, except that half of the wheel 406 is reserved for a clear portion 608, whereas the other half of the wheel 406 is divided into the red portion 602, the green portion 604, and the blue portion 606.

Figure 7A:
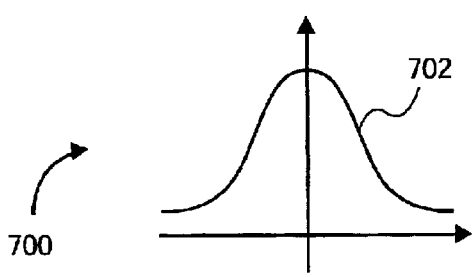
FIGS. 7A and 7B are diagrams of graphs showing light before it enters an integration rod, such as that of FIG. 4, and after it leaves the integration rod, respectively, according to an embodiment of the invention.
Figure 7B:
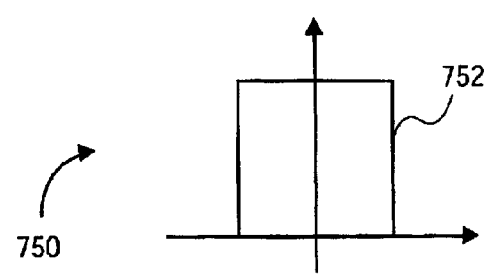

Referring back to FIG. 4, the combined light passing through the color wheel 406 next passes through the integration rod 408. The integration rod 408 renders the combined light more uniform. The integration rod 408 may also be referred to as a light pipe. FIGS. 7A and 7B show approximations of how light approaching the integration rod 408 appears, and how light leaving the integration rod 408 appears, respectively. In FIG. 7A, the graph 700 shows a line 702 representative of the brightness of the light over a distance, prior to the light reaching the integration rod 408. The light is brighter at the center than at the ends. By comparison, in FIG. 7B, the graph 750 shows a line 752 representative of the brightness of the light over the distance after the light has passed through the integration rod 408. The light is uniformly bright across the entire cross-sectional distance.

Referring back to FIG. 4, once the combined light passes through the integration rod 408, it passes through the collimating lens 410, which collimates the light before it reaches the SLM 106. The SLM 106 is configured by the image controller 109 based on the desired image received from the image source 107. Specifically, the SLM 106 is configured based on the current color of the light that the color wheel 406 has passed. For example, if the color wheel 406 passed only red light, then the SLM 106 is configured in accordance with the red parts of the desired image. As another example, if the color wheel 406 passes all light through a clear portion thereof, then the SLM 106 is configured in accordance with all color parts of the desired image. The light thus reflects off the SLM 106 and transmits through the projection optics 108 that focus the light onto the screen 110, on which viewers see the desired image.

The system 400 therefore combines the compensatory light of the narrow-spectrum light source 104 with the broad-spectrum light of the broad-spectrum light source 102 prior to the then-combined light passing through the color wheel 406. This approach to utilizing a narrow spectrum of light to compensate for a partial spectral deficiency in a broad spectrum of light is preferably employed when the partial spectral deficiency relates to light brightness. Where the broad spectrum of light has a spectral part at which it is not as bright as desirable, utilizing a corresponding narrow spectrum of light can be accomplished as shown in FIG. 4 to add to this brightness and yield more uniform brightness across the entire visible light spectrum.

Figure 8:
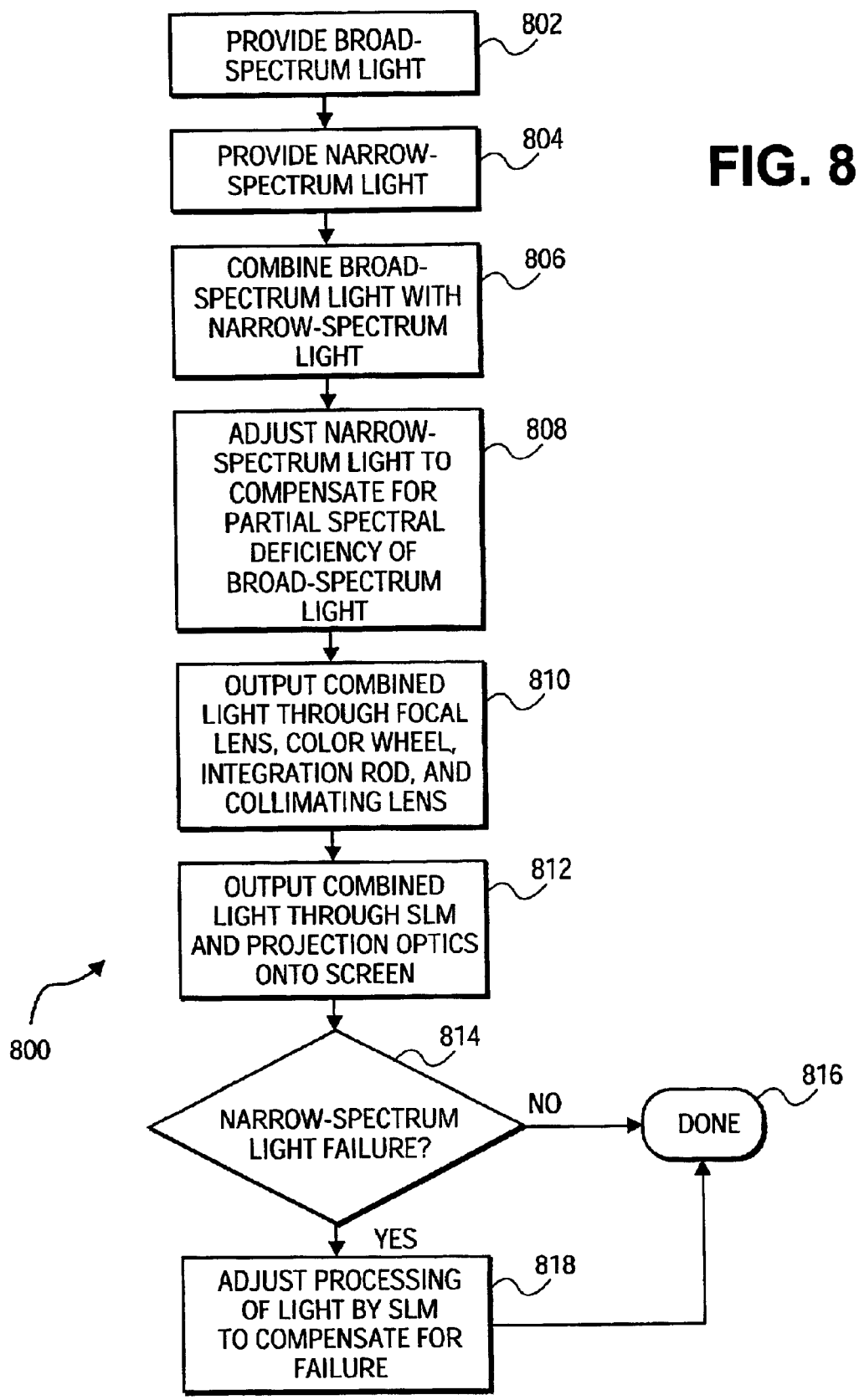
FIG. 8 is a flowchart of a method of use according to an embodiment of the invention that is consistent with the system of FIG. 4.

FIG. 8 shows a method 800 according to an embodiment of the invention. The method 800 is specifically a method of use for systems like the system 400 of FIG. 4 that has been described, among other systems. First, broad-spectrum light is provided by a broad-spectrum light source (802), and narrow-spectrum light is provided by a narrow-spectrum light source (804). The narrow-spectrum light complements the b road-spectrum light as has been described. The narrow-spectrum light is combined with the broad-spectrum light (806).

The narrow-spectrum light may be particularly adjusted to properly compensate for the partial spectral deficiency of the broad-spectrum light (808). This may be accomplished by the projector or projection system itself, or by user adjustment of controls provided on the projector or projection system. For instance, in the former case, a brightness sensor may determine the brightness of the narrow spectrum and compare it to the brightness of the broad spectrum as a whole. If the brightness of the narrow spectrum is greater than the desired brightness relative to the brightness of the broad spectrum, then the narrow-spectrum light output is decreased, and so on. In the case where the narrow-spectrum light source is a number of LED's, increasing or decreasing the brightness of the narrow-spectrum light may be accomplished by turning on or off more LED's, respectively.

Next, the combined light is output through light-source optics, such as a condenser lens, a rotatable color wheel, an integration rod, and a collimating lens (810), as has been described. Thereafter, the combined light is output through an SLM in accordance with a desired image, and projected through projection optics onto a screen for viewing (812). In this way, the method 800 achieves projection by combining narrow-spectrum light with broad-spectrum light so that the former compensates for weakness in the latter. Weakness is generally defined herein as having a reduced or lower than desired intensity for a range of wavelengths.

Finally, at some point, the narrow-spectrum light source may fail (814). If not, then the method 800 is finished (816). However, if the narrow-spectrum light source does fail, then the processing of the combined light by the SLM may be adjusted to attempt to compensate for this failure (818). That is, the SLM may be adjusted by the image controller to attempt to compensate for the failure of the narrow-spectrum light source. For example, the other parts of the spectrum at which the broad-spectrum light source is not deficient may be artificially decreased in brightness level so that uniform brightness is still achieved across the entire spectrum, albeit not at the desired brightness level, and so on.

Second Specific Embodiment of Projection System

Figure 9:
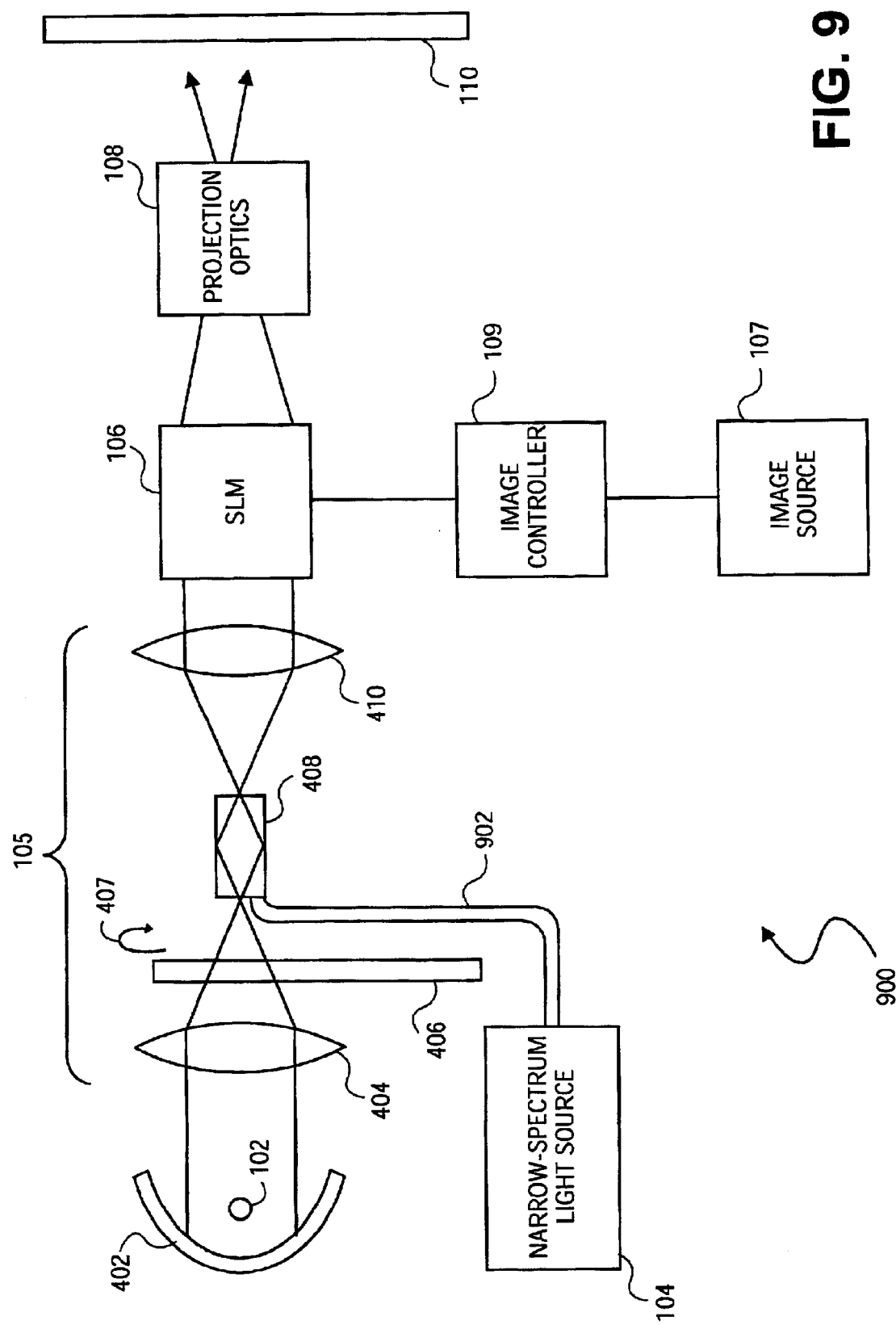
FIG. 9 is a cross-sectional side-view diagram of a projection system according to another specific embodiment of the invention in which narrow-spectrum light is combined with broad-spectrum light after the broad-spectrum light has passed through a rotatable color wheel.

FIG. 9 shows a cross-sectional side profile of a system 900 according to another embodiment of the invention. The system 900 is consistent with the system 100, and shows the system 100 in more detail in accordance with a specific embodiment of the invention. The broad-spectrum light source 102 is again preferably optically centered within the reflector 402, which is at least substantially elliptical in shape. The broad-spectrum light source 102 may be considered the primary light source. The narrow-spectrum light source 104 is located away from the broad-spectrum light source 102, outside of the reflector 402. The narrow-spectrum light source 104 may also be considered the secondary light source.

Thus, only the light from the broad-spectrum light source 102 passes through the condenser lens 404 and the color wheel 406 components of the light source optics 105. As before, the condenser lens 404 focuses the light through a portion of the color wheel 406, which rotates into and perpendicular to the plane of FIG. 9, as indicated by the arrow 407. The color wheel 406 may be a color wheel such as has already been shown in and described in conjunction with FIGS. 6A and 6B, or another type of color wheel. The light from the broad-spectrum light source 102, after passing through the condenser lens 404 and the color wheel 406, reaches the integration rod 408.

The light from the narrow-spectrum light source 104 is optically routed, preferably via fiber optics 902, to the integration rod 408 as well. Thus, at the integration rod 408 the broad-spectrum light is combined with the narrow-spectrum light. Preferably, but not necessarily, the light from the narrow-spectrum light source 104 is in sync with the color wheel 406, such that the light source 104 emits light when the color wheel 406 has turned to the color at which the broad-spectrum light source 102 is partially deficient. The integration rod 408 serves to render the cross-section of the combined light uniform, as has already been shown in and described in conjunction with FIGS. 7A and 7B. The combined light then passes through the collimating lens 410, which collimates the light before it reaches the SLM 106. The SLM 106 is configured by the image controller 109 based on the desired image received from the image source 107. As before, the SLM 106 is specifically configured based on the current color of the light that the color wheel 406 has passed. The light thus reflects off the SLM 106 and through the projection optics 108 that focus it onto the screen 110 on which viewers see the desired image.

The system 900 therefore combines the compensatory light of the narrow-spectrum light source 104 with the broad-spectrum light of the broad-spectrum light source 102 after the broad-spectrum light has passed through the condenser lens 404 and the color wheel 406. This approach to utilizing a narrow spectrum of light to compensate for a partial spectral power deficiency is preferably employed when the partial spectral deficiency relates to color intensity. Where the broad spectrum of light has a spectral part at which its color intensity is not as high as desirable, utilizing a corresponding narrow spectrum of light can be accomplished as shown in FIG. 9 to add to this color intensity and yield a more uniform color intensity across the entire visible light spectrum.

Figure 10:
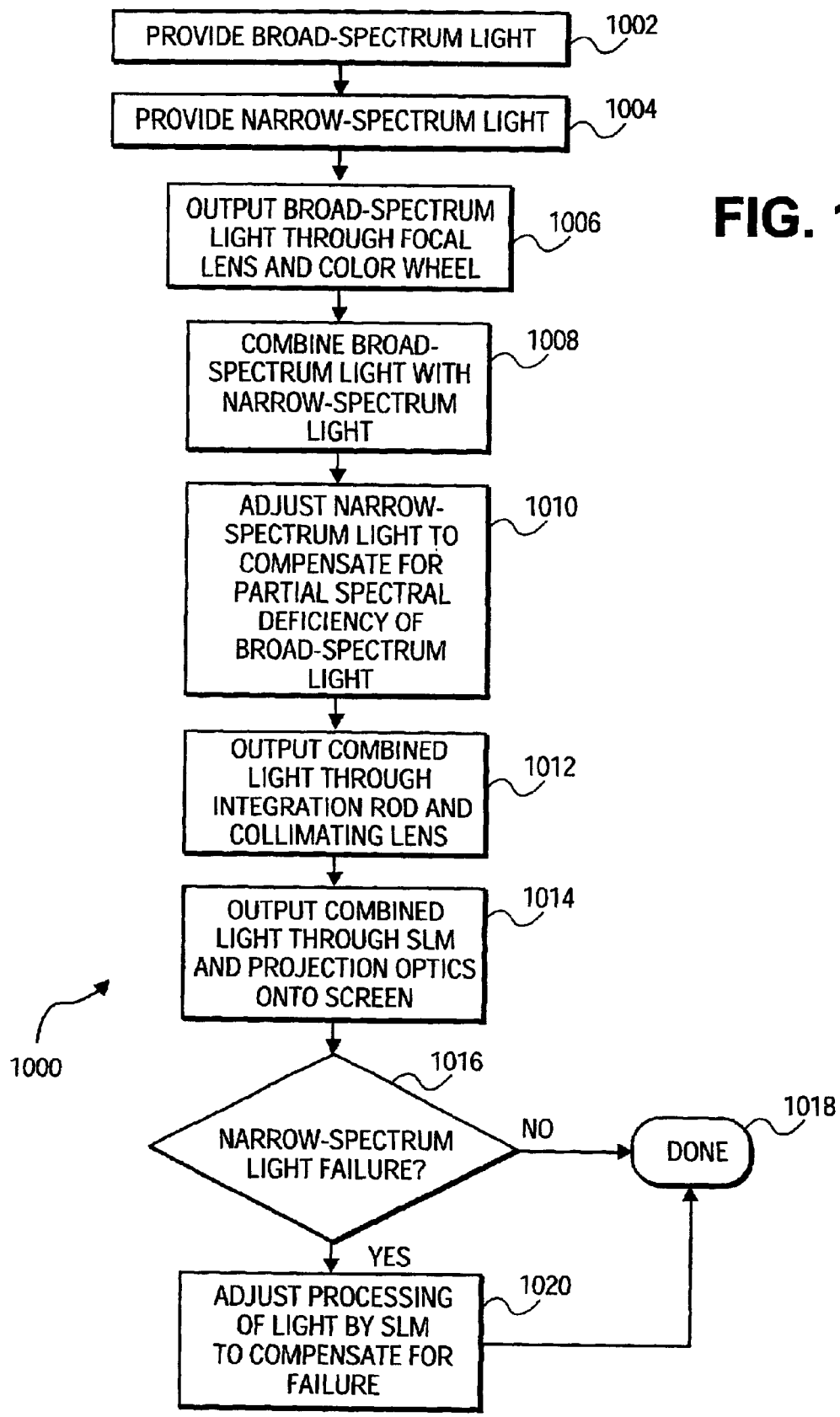
FIG. 10 is a flowchart of a method of use according to an embodiment of the invention that is consistent with the system of FIG. 9.

FIG. 10 shows a method 1000 according to an embodiment of the invention. The method 1000 is specifically a method of use for systems like the system 900 of FIG. 9 that has been described, among other systems. First, broad-spectrum light is provided by a broad-spectrum light source (1002), and narrow-spectrum light is provided by a narrow-spectrum light source (1004). The broad-spectrum light is output through a condenser lens and a rotatable color wheel (1006), and thereafter combined with the narrow-spectrum light (1008). As has been described, the narrow-spectrum light may be particularly adjusted to properly compensate for the partial spectral power deficiency of the broad-spectrum light (1010).

The combined light is then output through an integration rod and collimating lens (1012), and then through an SLM in accordance with a desired image and focused through projection optics onto a screen for viewing (1014). As before, at some point the narrow-spectrum light source may fail (1016). If not, then the method 1000 is finished (1018). However, if the narrow-spectrum light source does fail, then the processing of the combined light by the SLM may be adjusted to attempt to compensate for this failure (1020), as has been described.

Method of Manufacture of Projection System

Figure 11:
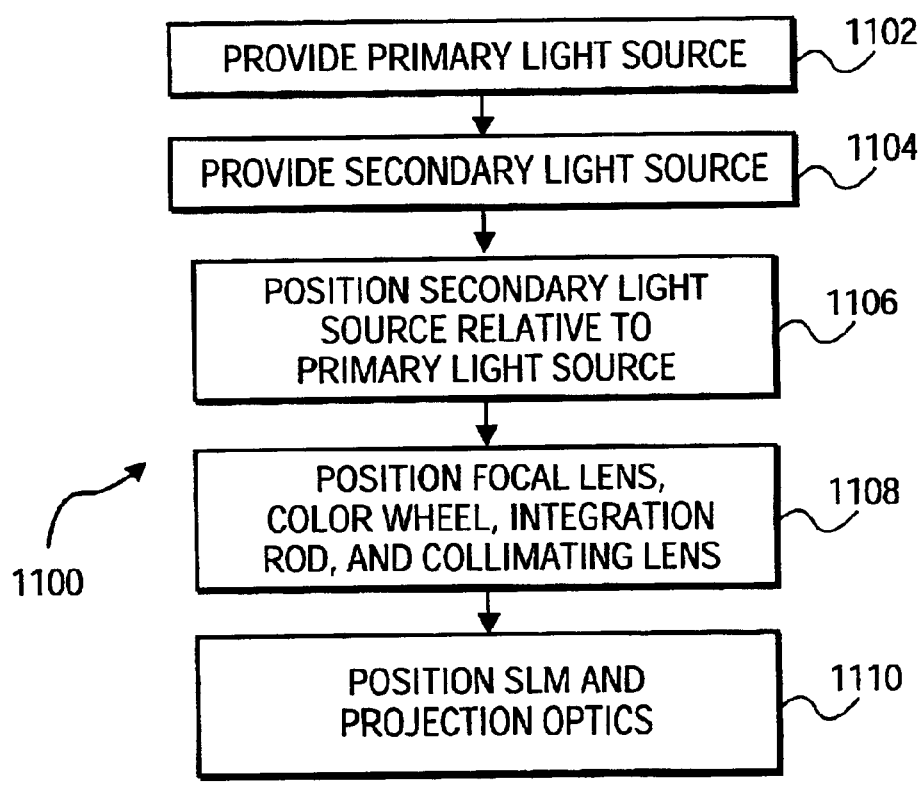
FIG. 11 is a flowchart of a method of manufacture according to an embodiment of the invention that is consistent with the systems of FIGS. 4 and 9.

FIG. 11 shows a method 1100 according to an embodiment of the invention. The method 1100 may be substantially utilized to manufacture a projector or projection system according to an embodiment of the invention as has been described. This may include the system 100 of FIG. 1, the system 400 of FIG. 4, the system 900 of FIG. 9, or another system according to an embodiment of the invention. The order of 1102, 1104, 1106, 1108, and 1110 as shown in FIG. 11 may vary. First, a primary light source having a broad spectrum is provided (1102), and a secondary light source having a narrow spectrum complementing the broad spectrum is provided (1104).

The secondary light source is positioned relative to the primary light source so that the light provided by the latter is combined with the light provided by the former (1106). This may be accomplished by, for example, positioning the secondary light source adjacent to the primary light source. As another example, fiber optics may be used to optically route the secondary light source wherever it is positioned so that its light can be combined with the light of the primary light source.

Next, light source optics, such as a condenser lens, a rotatable color wheel, an integration rod, and a collimating lens, are positioned (1108). The rotatable color wheel and the integration rod may specifically be positioned so that the light provided by the primary light source as combined with the light provided by the secondary light source pass through both of these light source optics components. Alternatively, the color wheel and the integration rod may be positioned so that the light provided by the primary light source passes through these components by itself, before combination with the light provided by the secondary light source. Finally, an SLM and projection optics are positioned (1110), so that the combined light passes through the SLM—that is, reflects off the SLM—and passes through the projection optics that focus it for display.

Conclusion

It is noted that, although specific embodiments have been illustrated and described herein, it will be appreciated by those of ordinary skill in the art that any arrangement is calculated to achieve the same purpose may be substituted for the specific embodiments shown. For example, other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A projection system, comprising:
   a reflector,
   a primary light source positioned within the reflector and having a broad spectrum; and,
   a secondary light source positioned adjacent to the primary light source within the reflector and having a narrow spectrum.

2. The projection system of claim 1, wherein the broad spectrum of die primary light source has a narrow spectral deficiency to which the narrow spectrum of the secondary light source corresponds.

3. The projection system of claim 2, wherein the narrow spectral deficiency is one of a light brightness deficiency at the narrow spectrum and a color intensity deficiency at the narrow spectrum.

4. The projection system of claim 1, wherein the secondary light source comprises a light ring in which the primary light source is centered.

5. The projection system of claim 4, wherein the light ring comprises a plurality of light-emitting diodes (LED's) arranged in a ring formation.

6. The projection system of claim 1, further comprising:
   a condenser lens to focus light output by the primary light source and the secondary light source as reflected by the reflector; and,
   a rotatable color wheel having at least red, green, and blue portions, the light focused by the lens onto the rotatable color wheel.

7. The projection system of claim 1, further comprising:
   an integration rod to render a uniform cross-section of light output by the primary light source and the secondary light source as reflected by the reflector; and,
   lens to collimate the light rendered uniform by the integration rod.

8. The projection system of claim 1, further comprising:
   a spatial light modulator (SLM) to modulate the light output by the primary light source and the secondary light source as reflected by the reflector in accordance with an image; and,
   optics to project outward the light as modulated by the SLM in accordance with the image.

9. A method for performance in conjunction with a projector comprising:
   providing light by a broad-spectrum light source having a broad spectrum;
   providing light by a narrow-spectrum light source having a narrow spectrum complementing the broad spectrum of the broad-spectrum light source;
   combining the light provided by the broad-spectrum light source with the light provided by the narrow-spectrum light source;
   outputting the light provided by the bread-spectrum light source through a rotatable color wheel prior to combination with the light provided by the narrow-spectrum light source; and,
   outputting the light provided by the broad-spectrum light source after outputting through the rotatable color wheel and as combined with the light provided by the narrow-spectrum light source through an integration rod.

10. The method of claim 9, further comprising adjusting the light provided by the narrow-spectrum light source to compensate for a partial spectral power deficiency of the broad spectrum of the light provided by the broad-spectrum light source, the narrow spectrum of the light provided by the narrow-spectrum light source corresponding to the partial spectral power deficiency.

11. The method claim 9, further comprising adjusting the light provided by the narrow-spectrum light source to compensate for a low color intensity of the broad spectrum of the light provided by the broad-spectrum light source, the narrow spectrum of the light provided by the narrow-spectrum light source having a high color intensity corresponding to the low color intensity of the broad spectrum of the light provided by the broad-spectrum light source.

12. The method of claim 9, further comprising outputting the light provided by the broad-spectrum light source as combined with the light provided by the narrow-spectrum light source through a spatial light modulator (SLM) and through projection optics.

13. The method of claim 9, further comprising outputting the light provided by the broad-spectrum light source as combined with the light provided by the narrow-spectrum light source through a rotatable color wheel and an integration rod.

14. A method for performance in conjunction with a projector comprising:
   providing a primary light source having a broad spectrum;
   providing a secondary light source having a narrow spectrum complementing the broad spectrum of the primary light source; and,
   positioning the secondary light source relative to the primary light source such that the secondary light source is adjacent to the primary light source within a reflector, so that light provided by the primary light source is combined with light provided by the secondary light source.

15. The method of claim 14, further comprising positioning a rotatable color wheel and an integration rod such that the light provided by the primary light source as combined with the light provided by the secondary light source passes through the rotatable color wheel and the integration rod.

16. The method of claim 14, further comprising positioning a spatial light modulator (SLM) and projection optics so that the light provided by the primary light source as combined with the light provided by the secondary light source passes through the SLM and the projection optics.

17. A method for performance in conjunction with a projector comprising;
   providing a primary light source having a broad spectrum;
   providing a secondary light source having a narrow spectrum complementing the broad spectrum of the primary light source;
   positioning the secondary light source relative to the primary light source such that the secondary light source is outside a reflector in which the primary light source is positioned and optically routing the light provided by the secondary light source for combination within the light provided by the primary light source, so that light provided by the primary light source is combined with light provided by the secondary light source;
   positioning a rotatable color wheel such that the light provided by the primary light source passes through the rotatable color wheel prior to being combined with the light provided by the secondary light source; and,
   positioning an integration rod such that the light provided by the primary light source as passed through the rotatable color wheel and combined with the light provided by the secondary light source passes through the integration rod.

* * * * *

UNITED STATES PATENT AND TRADEMARK OFFICE
CERTIFICATE OF CORRECTION

PATENT NO. : 6,733,139 B2
DATED : May 11, 2004
INVENTOR(S) : Childers et al.

It is certified that error appears in the above-identified patent and that said Letters Patent is hereby corrected as shown below:

Column 10,
Line 35, before "lens", insert -- a --.

Signed and Sealed this

Twenty-second Day of February, 2005

JON W. DUDAS
*Director of the United States Patent and Trademark Office*